(12) United States Patent
Hafner et al.

(10) Patent No.: US 6,394,411 B1
(45) Date of Patent: May 28, 2002

(54) EXTRACTOR VALVE ASSEMBLY

(75) Inventors: V. Walter Hafner, Whittier; Ron Hahn, Yorba Linda, both of CA (US)

(73) Assignee: AcornVac, Inc., Chino, CA (US)

( * ) Notice: Subject to any disclaimer, the term of this patent is extended or adjusted under 35 U.S.C. 154(b) by 0 days.

(21) Appl. No.: 09/732,369

(22) Filed: Dec. 8, 2000

(51) Int. Cl.⁷ .............................. F16K 7/04
(52) U.S. Cl. ............................. 251/7; 251/4
(58) Field of Search ................... 251/7, 8, 4

(56) References Cited

U.S. PATENT DOCUMENTS

| | | | | |
|---|---|---|---|---|
| 2,371,434 A | * | 3/1945 | Eppler ...................... | 251/7 X |
| 2,572,658 A | | 10/1951 | Perkins .................... | 119/14.08 |
| 2,958,502 A | * | 11/1960 | Grigsby ................... | 251/8 |
| 3,197,173 A | * | 7/1965 | Taubenheim ............. | 251/7 X |
| 3,278,153 A | * | 10/1966 | Dallas ...................... | 251/7 |
| 3,498,316 A | | 3/1970 | Pinder et al. | |
| 3,508,587 A | * | 4/1970 | Mauch ..................... | 251/4 |
| 3,724,461 A | * | 4/1973 | Eisenberg ................ | 251/4 X |
| 3,811,649 A | * | 5/1974 | Press et al. .............. | 251/8 |
| 4,322,054 A | * | 3/1982 | Campbell ................. | 251/7 X |
| 5,992,818 A | * | 11/1999 | Jones et al. .............. | 251/7 |

* cited by examiner

Primary Examiner—William C. Doerrler
Assistant Examiner—John Bastianelli
(74) Attorney, Agent, or Firm—Edgar W. Averill, Jr.

(57) ABSTRACT

An extractor valve assembly for controlling fluid flow in a fluid flow path. The extractor valve assembly has an elastic valve conduit having an outer surface with a pair of grooves. The pair of grooves are formed on opposite sides of the outer surface and intersect a pinch circumference of the elastic valve conduit, and are parallel to a central axis of the elastic valve conduit. When the elastic valve is pinched along the pinch circumference by pinch blades, pinch corners are formed at the pair of grooves, such that the pinching action completely blocks fluid flow. Additionally, first and second pairs of symmetric tabs are formed on the elastic valve on opposite sides of the pinch blades, to reduce stress along the portion of the pinch perimeter which comes in contact with the pinch blades.

15 Claims, 3 Drawing Sheets

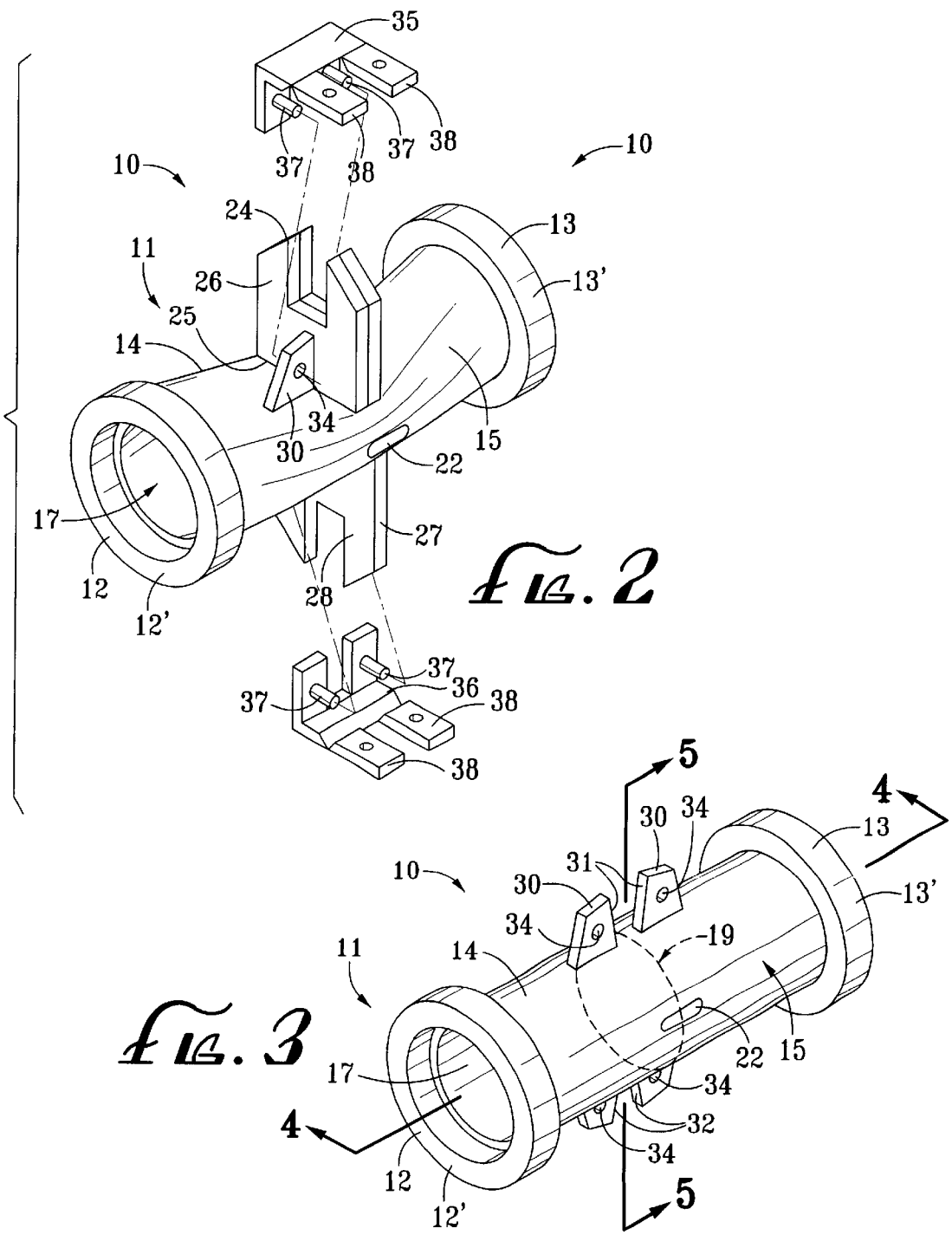

EXTRACTOR VALVE ASSEMBLY

BACKGROUND OF THE INVENTION

The field of the invention pertains to fluid control valves and more particularly to an extractor valve assembly for controlling fluid flow in a fluid flow path.

Various types of control and/or shutoff valves have been developed for use in plumbing, drainage, irrigation and other fluid flow applications and systems. In particular, it is known for extractor or pinch valves to provide a useful method of controlling fluid flow in sealed conduit systems where contamination and leakage are critical factors, such as in vacuum-line systems. They provide a sanitary and self-contained method of controlling fluid flow by applying an external force to collapse a resiliently biasing/elastic valve material such that opposing inner side walls of the elastic extractor valve occlude flow therethrough.

For example, in U.S. Pat. No. 2,572,658, an automatic teat cup release device for milking machines is shown having a cylindrical body with nipples projecting at its opposite ends. A collapsible section or tube made of rubber extends through the cylindrical body and is fitted in the bores of the nipples. Furthermore, surrounding the cylindrical body is an outer contractible wall, also made of rubber or like material. The outer contractible wall houses an outer chamber in controlled fluid communication with the cylindrical body. Due to the collapsible section or rubber tube being interposed in a vacuum line, a sufficient increase in vacuum would, thus, cause fluid in the outer contractible wall to flow into the fluid chamber of the cylindrical body, thereby causing the collapse of the collapsible conduit or tube. Furthermore, a flexible or folding connection is positioned between the cylindrical body and the collapsible tube section and functions to maintain the tube section in a closed position when the teat cup is ready to be released. However, the flexible folding connection, which preferably consists of two pairs of arms or links 39, 40, function as follower arms, and are not utilized to effectuate the collapse of the collapsible tube section to occlude the flow path.

Additionally, in U.S. Pat. No. 3,498,316, a positive position extractor valve is shown having a rubber collapsible conduit which is molded in a nearly closed position to prevent the generation of large, short radius stresses at the reverse bends at the side edges of the flattened portions when in a closed position. Furthermore, the rubber valve has projections 30 integrally formed on diametrically opposite sides of the outer surface and are pierced by pins 32 and 60. The pin 60 is actuated by a T-shaped operator 40 to collapse the rubber conduit to an occluded position.

While the '658 and '316 patents illustrate two methods of applying extractor valves in a useful manner, they do not sufficiently address the adequacy of the pinch mechanism and/or elastic valve, to prevent leakage therethrough. For high pressure flow lines, flow seepage may occur at pinch corners of the elastic valve, thereby causing the walls of the elastic valve conduit to vibrate at a harmonic frequency, thereby causing a buzzing noise or honking sound. While the '316 patent attempts to prevent large, radius stresses from forming at the reverse bends of the pinched section, flow seepage may still occur at the corners. In fact, due to the pre-molded curvilinear shape of the pinch corners, any amount of pinching pressure may not be sufficient to completely occlude flow at the pinch corners.

BRIEF SUMMARY OF THE INVENTION

It is an object of the present invention to provide an improved extractor valve assembly configured to more completely occlude a flow path when pinched, especially at the pinch corners.

It is a further object of the present invention to provide an improved extractor valve assembly having support tabs which provide improved distribution of pinching and release forces exerted by a pinching mechanism to prevent large pinch stresses from being concentrated at the pinch line.

The present invention is for an extractor valve assembly for controlling the flow in a fluid flow path. The extractor valve assembly comprises an elastic valve conduit, preferably made of rubber or like material, forming a flow passage through the elastic valve conduit. The elastic valve conduit is adapted to be interposed in the fluid flow path. Additionally, the elastic valve conduit has an outer surface with a pair of grooves formed on diametrically opposite sides thereof. The pair of grooves intersect a pinch circumference of the elastic valve conduit and is parallel to a central axis of the elastic valve conduit.

Furthermore, the extractor valve assembly also comprises means for releasably pinching the elastic valve conduit which is preferably a pair of pinch blades positioned along a pinch circumference of the elastic valve conduit. The blades are moved in a direction normal to a pinch line connecting the pair of grooves. In this manner, the resulting pinching action resiliently folds the elastic valve conduit along pinch corners formed at the pair of grooves and thereby releasably occludes the flow passage.

BRIEF DESCRIPTION OF THE DRAWINGS

FIG. 2 is an exploded perspective view of the extractor valve assembly, with the elastic valve conduit fully pinched.

FIG. 3 is a perspective view of the elastic valve conduit alone.

DESCRIPTION OF THE PREFERRED EMBODIMENTS

Figure 1:
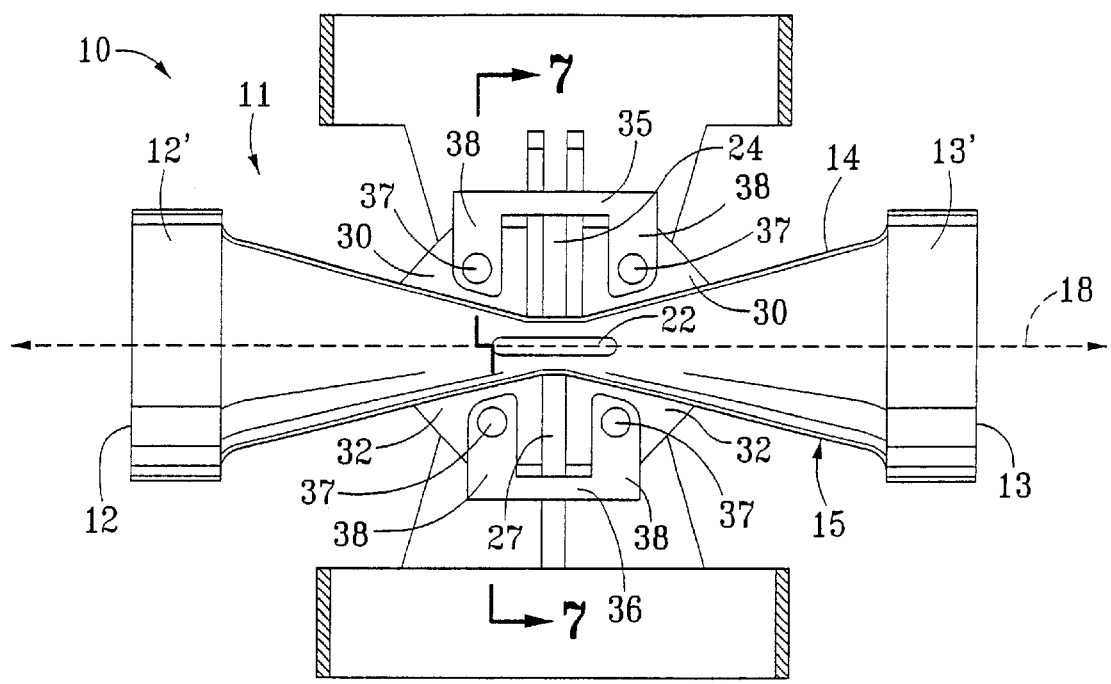
FIG. 1 is a side view of the extractor valve assembly, with the elastic valve conduit fully pinched.
Figure 4:
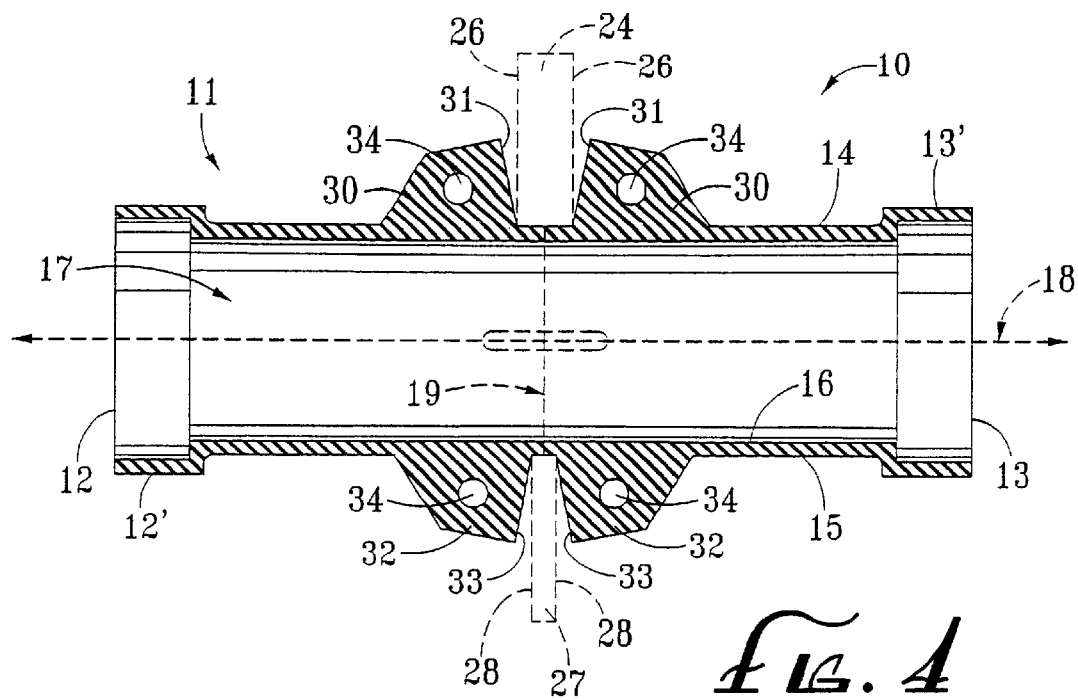
FIG. 4 is a cross-sectional view of the elastic valve conduit taken along line 4—4 of FIG. 3.

Referring now to the drawings, FIGS. 1–4 show the extractor valve assembly, generally indicated by reference character 10. The extractor valve assembly 10 comprises an elastic valve conduit or tube, generally indicated by reference character 11. The elastic valve conduit 11 is shown in its unbiased position in FIGS. 3 and 4, and fully resiliently biased in FIGS. 1 and 2. Preferably, the elastic valve conduit 11 has a generally cylindrical configuration with a central axis 18, but may not be limited only to such. It is notable that the term "extractor valve" is used and understood herein and in the claims to define a type of resiliently-biasing valve similar to that commonly known as pinch valves in the plumbing and irrigation industries, as well as other industries involving flow control systems.

As can be seen in the figures, the elastic valve conduit 11 has a first end 12 having a rim 12" and a second end 13 with a corresponding rim 13". The extractor valve assembly 10 is preferably interposed in a fluid flow path of a fluid flow system (not shown). The rims 12", 13" preferably function to assist in securing the elastic valve conduit 11 to the fluid flow path. In this manner, one of the first and second ends 12, 13 functions as the inlet end of the fluid flow, while the other of the first and second ends 12, 13 function as the exit end of the fluid flow.

Between the first and second ends 12, 13 of the elastic valve conduit 11 is a tube section 14. The tube section 14, as well as the first and second ends 12, 13, are preferably made of an elastomeric material, such as rubber, which allows resilient biasing of the tube section 14 when a pinching force is applied thereon. The tube section 14 of the elastic valve conduit 11 has an outer surface 15 and an inner surface 16, bordering a flow passage 17 therethrough. It is notable that the tube section 14 is preferably molded in a conventional cylindrical configuration as shown in the figures. However, the tube section 14 may alternatively be molded in a partially pinched configuration where less pinching movement is required to fully occlude the tube section 14.

Figure 5:
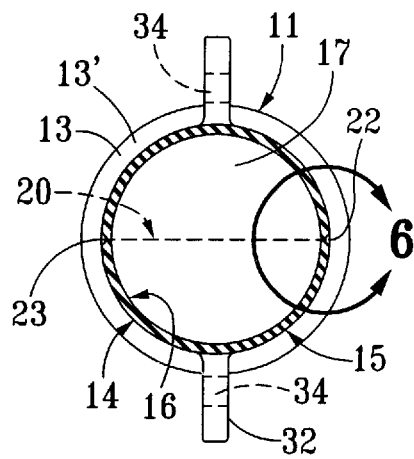
FIG. 5 is a cross-sectional view of the elastic valve conduit taken along line 5—5 of FIG. 3.
Figure 6:
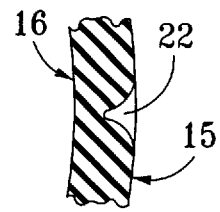
FIG. 6 is an enlarged view of circle 6 in FIG. 5, illustrating the shape of the groove.

As can be seen in the figures, the elastic valve conduit 11 preferably also has a pair of grooves 22, 23 formed on diametrically opposite sides of the outer surface 15. The pair of grooves 22, 23 are oriented parallel to the central axis 18 (FIGS. 1 and 4) of the elastic valve conduit 11. Additionally, as can be best seen in FIG. 4, the pair of grooves 22, 23 intersect a pinch circumference 19 which outlines the portion of the tube section 14 where the pinching action takes place (see also FIG. 3 for the pinching circumference 19). A pinch line 20 (FIG. 5) is defined between the pair of grooves 22, 23 in the flow passage 17. As can best be seen in FIG. 6, showing an enlarged cross-sectional view of the groove 22 encompassed by circle 6 of FIG. 5, the groove 22 preferably has a curvilinear cross-section, particularly along the valley portion thereof. Although not shown in the figures, groove 23 also preferably has a curvilinear cross-section identical to that of groove 22. The curvilinear cross-section of the grooves 22, 23 operate to better ensure structural integrity of the during the pinching process when the groove is inverted to produce an inverted bulge, as will be discussed in detail below.

The extractor valve assembly 10 also comprises means for releasably pinching the elastic valve conduit 11 along the pinch circumference 19. The means for releasably pinching is preferably a first pinch blade 24 having a first blade edge 25, and a second pinch blade 27 having a second blade edge 29. As can be best seen in FIG. 2, the second blade edge 29 and the first blade edge 25 are generally parallel to each other on opposite sides of the elastic valve conduit 11. The first and second blade edges 25, 29 are aligned along the pinch circumference 19 and are oriented to exert a pinch force normal to a pinch line 20 (FIG. 5) connecting the pair of grooves 22, 23. Preferably, the pinch blades 24, 27 are adapted to be synchronously actuated to releasably pinch the elastic valve conduit 11. This may be accomplished by a suitable actuator device known in the relevant art.

Figure 9:
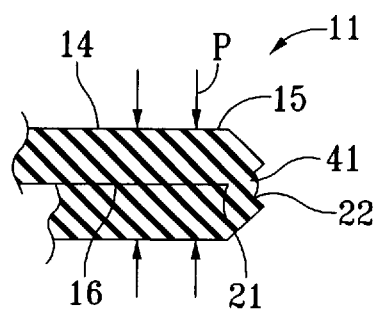
FIG. 9 is an enlarged cross-sectional view of FIG. 7 showing in detail the fully pinched configuration of the groove and pinch corner.

Consequently, the resulting pinching action from the first and second blades 24 and 27 converging on the pinch line 20 resiliently folds the elastic valve conduit 11 along the pinch corners 21 formed at the pair of grooves 22, 23. As can be best seen in FIGS. 7 and 9, the pinch corners 21 are formed on the inner surface 16 of the elastic valve conduit 11 immediately opposite the pair of grooves 22, 23. While not being bound by any particular theory, it is believed that the placement of the pair of grooves 22, 23 on the opposite outer surfaces of the elastic valve conduit 11, enables greater sealing contact of the inner surface 16 at the pinch corners 21 by reducing localized stresses in the elastic valve conduit 11 at the pinch corners 21. As can be best seen in FIG. 9 showing a representative pinch formation at the groove 22, the reduction of localized stresses at the pinch corners 21 may be attributed to the formation of an inverted bulge 41 at the groove 22 when the tube section 14 is fully pinched by pinch forces P. The inverted bulge 41 formation arises from the elastic nature and quality of the elastic valve conduit 11 and is believed to be the outward expansion of compressed elastic material during the pinch process.

Figure 8A:
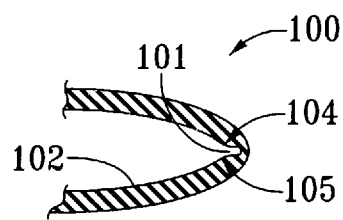
FIG. 8A is a cross-sectional view of an experimental extractor valve having a groove on the inner surface of the valve, and shown partially pinched.
Figure 8B:
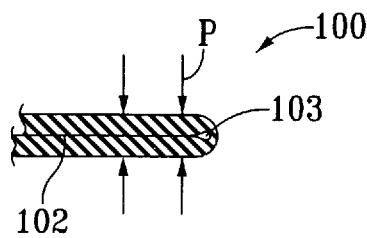
FIG. 8B is a cross-sectional view following FIG. 8A of an experimental extractor valve having a groove on the inner surface of the valve, and shown fully pinched.

Moreover, the provision of an expansion "outlet" directed away from the pinch corner 21 also effectively minimizes and/or prevents inward expansion of the compressed tube material. Based on experiments conducted by the applicant using elastic tube sections without grooves, it has been shown that the inner surface of the tube section has a tendency to buckle inward at the pinch corners. Such inward buckling and expansion of compressed material has been known to inhibit complete contact of opposing sides of the inner surface 16 at the pinch corners 21 by sandwiching between the opposing sides and producing a separation therebetween. Additionally, as shown in FIGS. 8A and 8B, further experiments conducted by the applicant on an experimental elastic valve conduit 100 having a groove 101 located on the inner surface 102 also results in flow seepage and noise. It has been shown that the groove's 101 placement along the inner surface 102 produces a gap 103 (FIG. 8B) at the pinch corners. The gap 103 is caused in part to the contacting of groove corners 104 and 105 when pinched, which prevents complete sealing of the groove 101 without a high pressure force greater than that provided by a pinch force P sufficient to otherwise collapse the elastic valve conduit 100. Therefore, and in comparison, the greater sealing contact provided by the externally located grooves 22, 23 of the present invention effectively eliminates fluid seepage through the pinch corners 21, as well as the buzzing or honking sound produced thereby. It is notable that the preferably curvilinear cross-section of the grooves 22, 23 operate to better ensure structural integrity of the grooves 22, 23 when inverted to produce the inverted bulge 41. The continuous surface of a curvilinear cross-section prevents or minimizes the possibility of tears occurring in the grooves 22, 23 when such pinching action and groove inversions takes place.

Preferably, as shown in the figures, the extractor valve assembly 10 further comprises a first pair of tabs 30 and a second pair of tabs 32 connected to diametrically opposite sides of the outer surface 15. Each pair of the first and second pairs of tabs 30, 32 are equidistant from the pair of grooves 22, 23. Furthermore, each pair of the first and second pairs of tabs 30, 32 are symmetrically positioned about the pinch circumference 19. Moreover, the first pinch blade 24 is positioned between the first pair of tabs 30 and the second pinch blade 27 is positioned between the second pair of tabs 32. Preferably still, the first pair of tabs 30 are connected to each other by a first connector bridge 35 straddled across the first pinch blade 24 and linking the first pair of tabs along connector holes 34. Additionally, the second pair of tabs 32 are connected to each other by a second connector bridge 36, also straddled across the second pinch blade 27 and connecting the second pair of tabs 32 along connector holes 34.

In this manner, upon being centrally actuated by disengaging first and second pinch blades 24, 27, the first and second connector bridges 35, 36 uniformly act upon the first and second pairs of tabs 30, 32, respectively to pull open the elastic valve conduit 11 from its occluded state. Moreover, the advantage of the symmetric dual tabs on either side of the elastic valve conduit 11 provides a distributed pulling force on opposite sides of the elastic valve conduit 11, thereby reducing localized stresses along the pinch circumference 19 of the outer surface 15 when returning to the unbiased state. It if further notable that attachment of the tabs 30, 32 to the pinching blades 24, 27 in the foregoing manner may additionally operate to retard noise caused by a vibrating wall of the tube section 14 of the elastic valve conduit 11.

Additionally, each tab of the first and second pairs of tabs 30, 32 preferably has an abutment portion 31, 33 adjacent a corresponding blade side wall 26, 28 of the first and second pinch blades 24, 27. This can be best seen in FIGS. 3 and 4. Each abutment portion 31, 33 is adapted to be spaced from the corresponding blade side wall 26, 28 when the elastic valve conduit 11 remains unbiased (as can be shown in FIG. 4). Moreover, as can be seen in FIG. 1, the abutment portion 31, 33 abuts against the corresponding blade side wall 26, 28, when the elastic valve conduit 11 is resiliently biased in the occluded state. It is notable that although the elastic valve conduit 11 in FIG. 1 is not completely pinched, the abutment portions 31, 32 are abutted against the corresponding blade side walls 26, 28. Thus, if the blades are further actuated to fully occlude the elastic valve conduit 11, the first and second pairs of tabs 30, 32 operate to correspondingly resiliently bias the tube section 14 along the areas adjacent the pinching circumference 19. In this manner, when the elastic valve conduit 11 is resiliently biased, the tabs reduce the formation of high localized stresses along the contact point of the blade edges 25, 29 and the pinch circumference 19. This prevents tears from forming along the pinch circumference 19 where it contacts the pinch blade edges 25, 29, and provides a more durable arrangement to withstand repeated opening and closing cycles without failure. Furthermore, the pinching blades 24, 27 may have rounded or otherwise blunt blade edges to prevent tearing or otherwise breaching the outer surface 15 of the tube section 14.

Figure 7:
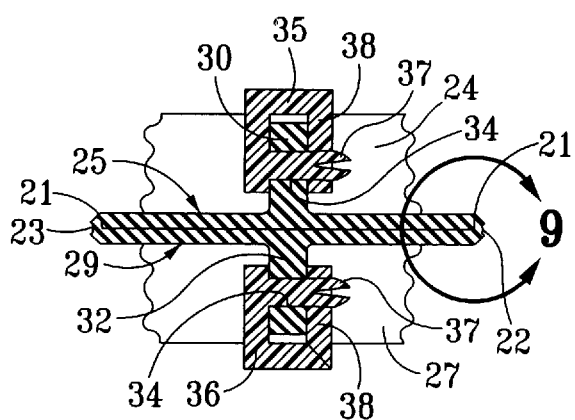
FIG. 7 is a cross-sectional view of the extractor valve assembly taken along line 7—7 of FIG. 1.

As can be best seen in FIGS. 1, 2 and 7, the first and second connector bridges 35, 36 preferably have flaps 38 and securing pins 37 which connect each corresponding pair of tabs. In this preferred embodiment, each securing pin 37 extends through each corresponding connection hole 34 and snaps together with the flaps 38 to provide a secure yet removable connection.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. An extractor valve assembly 10 for controlling fluid flow in a fluid flow path, said extractor valve assembly 10 comprising:

an elastic valve conduit 11 forming a flow passage 17 therethrough and adapted to be interposed in said fluid flow path, said elastic valve conduit 11 having a flexible wall in said elastic valve conduit 11, said flexible valve having an outer surface 15 with a pair of grooves 22, 23 formed on diametrically opposite sides thereof, said pair of grooves 22, 23 creating a thinning of said flexible wall under each said pair of grooves and said pair of grooves 22, 23 intersecting a pinch circumference 19 of said elastic valve conduit 11 and parallel to a central axis 18 of said elastic valve conduit 11; and means for releasably pinching said elastic valve conduit 11 along said pinch circumference 19 normal to a pinch line 20 connecting said pair of grooves 22, 23, wherein the resulting pinching action resiliently folds said elastic valve conduit 11 along pinch corners 21 formed at said pair of grooves 22, 23, and releasably occludes said flow passage 17.

2. The extractor valve assembly 10 as in claim 1, wherein each of said pair of grooves 22, 23 have a curvilinear cross-section.

3. The extractor valve assembly 10 as in claim 1, wherein said elastic valve conduit 11 has first and second pairs of tabs 30, 32 connected to diametrically opposite sides of said outer surface 15, each pair of said first and second pairs of tabs 30, 32 being equidistant from said pair of grooves 22, 23 and symmetric about said pinch circumference 19.

4. The extractor valve assembly 10 as in claim 3, wherein said means for releasably pinching comprises a first pinch blade 24 positioned between said first pair of tabs 30 and a second pinch blade 27 positioned between said second pair of tabs 32, said first and second pinch blades 24, 27 aligned with said pinch circumference 19 and adapted to be synchronously actuated to releasably pinch said elastic valve conduit 11.

5. The extractor valve assembly 10 as in claim 4, wherein said first pair of tabs 30 are connected to each other by a first connector bridge 35 straddled across said first pinch blade 24, and said second pair of tabs 32 are connected to each other by a second connector bridge 36 straddled across said second pinch blade 27, whereby, upon being centrally actuated by said first and second pinch blades 24, 27, said first and second connector bridges 35, 36 uniformly act upon said first and second pairs of tabs 30, 32, respectively.

6. The extractor valve assembly 10 as in claim 4, wherein said first and second pinch blades 24, 27 each have a pair of opposing blade sidewalls 26, 28, and wherein each tab of said first and second pairs of tabs 30, 32 has an abutment portion 31, 33 adjacent a corresponding blade sidewall 26, 28 of said first and second pinch blades 24, 27, each abutment portion 31, 33 adapted to be spaced from the corresponding blade sidewall 26, 28 when said elastic valve conduit 11 remains unbiased, and abutted against the corresponding blade sidewall 26, 28 when said elastic valve conduit 11 is resiliently biased in the occluded state.

7. The extractor valve assembly 10 as in claim 6, wherein said abutment portions 31, 33 of said first pair of tabs 30 are symmetric about said pinch circumference 19, and said abutment portions 31, 33 of said second pair of tabs 32 are symmetric about said pinch circumference 19.

8. The extractor valve assembly 10 as in claim 3, wherein said first and second pairs of tabs 30, 32 are integrally formed on said outer surface 15 of said elastic valve conduit 11.

9. An improved extractor valve assembly 10 for controlling fluid flow in a fluid flow path, said extractor valve assembly 10 of the type having an elastic valve conduit 11 forming a flow passage 17 therethrough and adapted to be interposed in said fluid flow line, and means for releasably pinching said elastic valve conduit 11 along a pinch circumference 19 wherein the resulting pinching action resiliently collapses said elastic valve conduit 11 along said pinch circumference 19 to releasably occlude said flow passage 17, wherein said elastic valve conduit 11 has a flexible wall, the improvement comprising:

first and second pairs of tabs 30, 32 connected to diametrically opposite sides of an outer surface 15 of said elastic valve conduit 11, each pair of said first and second pairs of tabs 30, 32 symmetric about said pinch circumference 19; and the improvement further comprising a pair of grooves 2, 23, creating a thinning of said flexible wall under each said pair of grooves and said pair of grooves 22, 23 integrally formed on diametrically opposite sides of said outer surface 15 of said elastic valve conduit 11 equidistant from said first and second pairs of tabs 30, 32 and parallel to a central axis 18 of said elastic valve conduit 11, wherein the resulting pinching action resiliently folds said elastic valve conduit 11 along pinch corners 21 inversely formed at said pair of grooves 22, 23, and releasably occludes said flow passage 17.

10. The improved extractor valve assembly 10 as in claim 9, wherein said means for releasably pinching comprises a first pinch blade 24 positioned between said first pair of tabs 30 and a second pinch blade 27 positioned between said second pair of tabs 32, said first and second pinch blades 24, 27 aligned with said pinch circumference 19 and adapted to be synchronously actuated to releasably pinch said elastic valve conduit 11.

11. The improved extractor valve assembly 10 as in claim 10, wherein said first pair of tabs 30 are connected to each other by a first connector bridge 35 straddled across said first pinch blade 24, and said second pair of tabs 32 are connected to each other by a second connector bridge 36 straddled across said second pinch blade 27, whereby, upon being centrally actuated by said first and second pinch blades 24, 27, said first and second connector bridges 35, 36 uniformly act upon said first and second pairs of tabs 30, 32, respectively.

12. The improved extractor valve assembly 10 as in claim 10, wherein said first and second pinch blades 24, 27 each have a pair of opposing blade sidewalls 26, 28, and wherein each tab of said first and second pairs of tabs 30, 32 has an abutment portion 31, 33 adjacent a corresponding blade sidewall 26, 28 of said first and second pinch blades 24, 27, each abutment portion 31, 33 adapted to be spaced from the corresponding blade sidewall 26, 28 when said elastic valve conduit 11 remains unbiased, and abutted against the corresponding blade sidewall 26, 28 when said elastic valve conduit 11 is resiliently biased in the occluded state.

13. The improved extractor valve assembly 10 as in claim 12, wherein said abutment portions 31, 33 of said first pair of tabs 30 are symmetric about said pinch circumference 19, and said abutment portions 31, 33 of said second pair of tabs 32 are symmetric about said pinch circumference 19.

14. The improved extractor valve assembly 10 as in claim 9, wherein said first and second pairs of tabs 30, 32 are integrally formed on said outer surface 15 of said elastic valve conduit 11.

15. The improved extractor valve assembly 10 as in claim 9, wherein each of said pair of grooves 22, 23 have a curvilinear cross-section.

\* \* \* \* \*